United States Patent [19]

Pritelli

[11] 4,243,081

[45] Jan. 6, 1981

[54] AUTOMATIC APPARATUS FOR MACHINING PANELS, PLANKS AND SIMILAR ARTICLES MADE OF WOOD, WOODEN DERIVATIVES AND THE LIKE

[75] Inventor: Giuseppe Pritelli, Cattolica, Italy

[73] Assignee: Pritelli, S.p.A., Morciano-di Romagna, Italy

[21] Appl. No.: 960,250

[22] Filed: Nov. 13, 1978

Related U.S. Application Data

[63] Continuation-in-part of Ser. No. 682,404, May 3, 1976, abandoned.

[30] Foreign Application Priority Data

May 13, 1975 [IT] Italy .................................. 3410 A/75
May 27, 1975 [IT] Italy .................................. 3432 A/75
May 27, 1975 [IT] Italy .................................. 3433 A/75

[51] Int. Cl.³ ............................................... B27C 9/04
[52] U.S. Cl. ...................................... 144/3 A; 29/33 P; 29/563; 83/210; 83/282; 83/370; 83/453; 144/3 L; 144/1 R; 144/35 R; 144/245 A; 144/326 R; 408/26
[58] Field of Search ............ 144/1 R, 2 R, 3 R, 35 R, 144/242 R, 242 M, 245 A, 326 R, 3 A, 3 L; 408/26, 27, 28; 83/209, 210, 282, 360, 370, 453; 29/33 P, 563; 269/289 R

[56] References Cited

U.S. PATENT DOCUMENTS

| | | | |
|---|---|---|---|
| 3,357,690 | 12/1967 | Firestone | 83/209 X |
| 3,483,904 | 12/1969 | Jacumin | 144/3 R |
| 3,538,968 | 11/1970 | Gluck | 144/2 R X |
| 3,833,033 | 9/1974 | Hurn | 144/3 R |

*Primary Examiner*—W. Donald Bray
*Attorney, Agent, or Firm*—Browdy and Neimark

[57] ABSTRACT

Disclosed herein is an automatic apparatus for machining panels or similar articles and, particularly, for drilling and milling them in accordance with the "Folding" system. With this apparatus, the panel to be machined is carried by conveyor means, in a direction parallel to its longitudinal axis, towards drilling and milling devices placed one after the other, the latter being able to mill the panel transversely with respect to the direction in which it moves forward. The operation of the drilling and milling devices takes place contemporaneously in unison, controlled by a feeler device located after the milling devices, which is able to perceive the presence of milling in the panel and to consequently cause the panel to halt and to be in the exact position necessary for the aforementioned drilling and milling devices.

9 Claims, 14 Drawing Figures

AUTOMATIC APPARATUS FOR MACHINING PANELS, PLANKS AND SIMILAR ARTICLES MADE OF WOOD, WOODEN DERIVATIVES AND THE LIKE

CROSS REFERENCE TO RELATED APPLICATION

This application is a Continuation-in-Part Application of application Ser. No. 682,404, filed May 3, 1976, and now abandoned.

BACKGROUND OF THE INVENTION

This invention relates to an automatic apparatus for machining panels, planks or similar articles made of wood or wooden derivatives and, particularly, for milling and drilling in accordance with the "Folding" system.

The "Folding" system for machining panels of wood or wooden derivatives, which is particularly suitable and advantageous for creating closed structures, especially with a rectangular peripheric extension, consists essentially in forming on a panel a plurality of millings (V-shaped grooves) that extend transversely thereto over its full width, for a depth equal to the thickness of the panel. Subsequently, the panel is bent where the milling operations have been carried out and the opposite milled surfaces are glued in such a way as to obtain the final configuration of the closed structure it is intended to create.

DESCRIPTION OF THE PRIOR ART

One type of machine commonly used for the operations consists essentially of a set of cutter tools carried by a horizontal support, these rotating around a horizontal shaft, spaced horizontally away from one another by the same amount as the millings it is wished to make in the panel, corresponding to the length of the lateral sides of the structure it is wished to make.

Below the cutter tools is placed a horizontal infeed platform, movable in a direction perpendicular to the axis of the said cutters, onto which is laid and locked, through suitable means, a panel ready to be subjected to the machining operations.

The infeed platform also serves as the surface on which the panel is rested whilst the machining operations are taking place and because of the extreme precision required whilst milling and, above all, because of the platform having to be of a considerable length, that is to say, identical to the periphery of the closed structure it is wished to create, the plant is extremely cumbersome and costly.

On the machines downstream from the cutter tools, in the direction in which the panel moves forward, a set of drilling tools is provided, these being to make a number of holes in the panel on which the milling operations have been performed.

Normally a considerable number of holes are required, spread over the whole panel along its full length and this necessitates quite a few drilling tools being provided and contributes further to increasing the overall dimensions and the cost of the plant in question.

Furthermore, should the panel on which, as stated above, prior transverse milling operations have been carried out, not be positioned perfectly for the drilling tools, this could cause all the holes to be staggered with respect to the aforementioned milling and to their not corresponding with those in the opposite sides when the closed structure is subsequently formed.

Another difficulty with such known machines comes from the fact that the support on which the cutter tools are mounted has a considerable clearance and thus it is prone to sag noticeably, particularly in relation to the extreme precision needed for this particular operation.

Yet another difficulty still is that there is only one working direction per machining operation; in other words, once a panel has been machined, it is necessary to wait for the infeed platform to return to its original position before proceeding with the machining of the next panel.

Another type of machine known in this particular industry is semi-automatic, with the panel being supplied along a direction parallel to its longitudinal axis. On this machine, there is one single cutter tool, the movement of which is transverse with respect to the direction in which the panel moves forward.

The required milling operations are carried out at points where a cutter tool or tools are positioned, while the panel is held motionless between periods during which it is advanced intermittently through the apparatus.

In known apparatus of this type, the drilling operations are performed after the milling with the undesirable consequences identical to those of the above-mentioned type. Additionally, however, an account of the longitudinal infeeding of the panel, there is a possibility of dangerous flexion occurring due to the numerous transverse millings which, as previously stated, extend for a depth equal to the thickness of the panel, thereby rendering it highly fragile from a flexional point of view.

With the foregoing, the cutter tools, be they fixed or mobile, depending upon the type of machine, employ one tool only which rotates in one single direction. To be more precise, since the direction of rotation has to suit the tool/panel forward motion direction, it is chosen in such a way as to prevent splintering on the surface of the panel being machined.

In like fashion, similar problems occur at the time the tool pierces the panel since splintering can easily take place on the edge where it goes in.

Furthermore, in view of what has been stated above and since the direction in which the tool rotates is constant, machining only takes place in one direction, that is to say, the relevant motion between the tool and the panel occurs in one single direction and this gives rise to extremely lengthy machining times.

Referring again to the second type of machine mentioned, the infeeding of the panel along a direction parallel to its longitudinal axis is achieved with the use of a conveyor belt which positions the panel suitably at the point where the machining device is located, with the panel utilizing the rigid support platform over which the belt slides, as the surface on which it rests.

As can be seen from the foregoing, therefore, the conveyor belt is always present between the panel and the surface on which the panel rests and since the said belt is normally made of rubberized material, that is to say, of a meterial which gives elastically and does not have good rigidity characteristics, it cannot be used both as a means of transportation and positioning in cases when extremely precise machining is required which necessitates, as the surface on which the panel being machined is to rest, a perfectly rigid surface.

SUMMARY OF THE INVENTION

An essential object of the present invention is, therefore, to overcome the difficulties mentioned above and, in particular, to make available an automatic apparatus for machining panels in accordance with the "Folding" system, which is able to contemporaneously carry out milling and drilling operations and, above all, is able to offer the characteristic typical of the "Folding" system which envisages the machining operations being repeated one after the other.

Another object of the present invention is to make available an automatic apparatus which, on account of its specific configuration, is able to completely prevent staggering between the holes drilled in the panel and the milling operations carried out thereon.

Another object of the present invention is to make available an automatic apparatus which achieves the objects mentioned above, is able to effect the milling and drilling operations, and, at the same time, prevent the panel being subjected to flexure.

Another object of the present invention is to make available an automatic apparatus which satisfies the objects mentioned above and on which the cutter tools are able to prevent problems from arising pertaining to the splintering of the material at the time the tool pierces the panel, whilst the machining operation is in progress and when the tool is being withdrawn therefrom.

Another object still of the present invention is to make available an automatic apparatus on which the cutter tools are able to operate in both directions, thereby reducing considerably the machining times and, consequently, cutting down the time required for replacing the cutters as they wear out.

Another object of the present invention is to make available an automatic apparatus on which the continuous conveyor belt can offer, as the platform on which the panel is to rest whilst being machined, a perfectly rigid surface.

Yet another object still of the present invention is to make available an automatic apparatus which achieves the objects outlined above and on which the infeeding of the panel towards the drilling and cutter tools can take place one after another without waiting times due to the return travel of the infeed platform, thereby notably decreasing the time taken for machining.

A further but by no means a final object of the present invention is for the objects previously mentioned to be attained through an automatic apparatus for machining panels, planks or similar articles made of wood or wooden derivatives and, particularly for milling and drilling in accordance with the "Folding" system, which is extremely simple, most definitely efficient in operation and, above all, taking into account the results that can be achieved with it, is relatively cheap in cost.

These and other objects too have been attained with the automatic apparatus forming the subject of the present invention, essential features of which are that it comprises in combination and in line: means for carrying a panel in a direction parallel to its longitudinal axis; a set of drilling tools positioned along the path along which a panel laid ready to be machined is carried forward; at least two cutter devices following on after the aforementioned drilling tools, positioned one after the other, for milling the panel along a direction transverse to that in which it is infed; and at least one feeler device, installed after the said cutter devices, able to perceive the presence of milling in the panel and to consequently cause the panel to halt and to be in the exact position necessary for the aforementioned drilling and milling tools, the distance the said feeler device is away from the above mentioned cutter tools being equal to the length of the various lateral sides or to the sum of the lengths of the various lateral sides of the structure it is wished to form once the panel has been machined, the distance between the feeler device and the said cutter tool nearest to it being equal to the length of one of the lateral sides of the above-mentioned structure; the operation of the aforementioned drilling holes taking place contemporaneously in combination with that of the said cutter devices.

BRIEF DESCRIPTION OF THE DRAWINGS

Further characteristics and advantages of the present invention will become clearly apparent from the following detailed description of a preferred but not the sole embodiment for the automatic plant according to the present invention illustrated purely as a non-limiting example on the accompanying sheets of drawing.

DESCRIPTION OF THE PREFERRED EMBODIMENT

Figure 1:
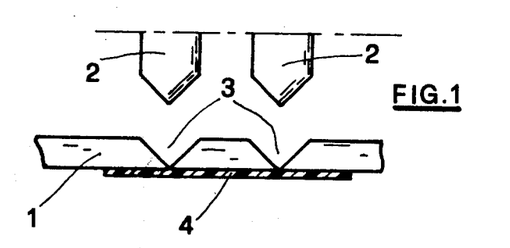
FIG. 1 shows, in a front diagrammatic view, a panel on which a number of transverse millings have been executed.

The "Folding" system for machining panels made of wood or wooden derivatives, to which reference has been made, and which can be produced using apparatus according to the present invention, consists in executing on a panel 1, using one or more cutters 2, which in the case given in this example are constituted by angle cutters, one or more grooves that extend transversely thereto over its full width, for a depth equal to its thickness (see FIG. 1).

Figure 2:
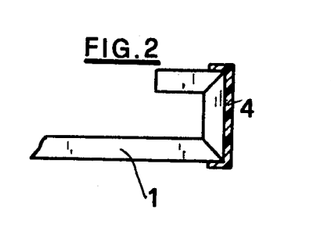
FIG. 2 shows, in front elevation form, the same panel depicted in FIG. 1 after it has been subjected to bending and gluing.

On the underside of the panel, that is to say, on the surface opposite that on which the milling operations have been performed, at a point corresponding thereto, a deformable plastic material lamination 4 is glued to the panel 1 over a length that is equal to the width of the said panel (see FIGS. 1 and 2), the purpose of which is to keep it together and to "bond it" both whilst the previously mentioned milling operations are taking place (see FIG. 1) and during the subsequent bending and gluing stage (see FIG. 2).

Figure 3:
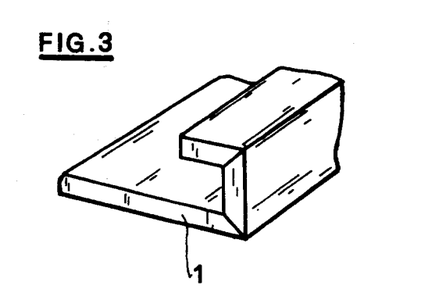
FIG. 3 shows, in a perspective view, the same panel depicted in FIGS. 1 and 2 in its final configuration.

Subsequently, when the opposite milled surfaces of the panel have been rendered integral with each other, that is to say, once the gluing operation is over, the plastic laminate 4 can be removed to give the final configuration shown in FIG. 3.

This system of machining can also be extended to chipboard or similar panels and when it is, a plastic laminate is used which extends across the full surface of the panel, on the opposite surface to that which has to be glued. The plastic laminate can represent various types of grain. The milling and bending operations are performed in the way stated above but, once the bonding has been executed, the plastic laminate 4, instead of being removed, is utilized both as a bonding means and as a means of giving the panel a pleasing final appearance.

Figure 4:
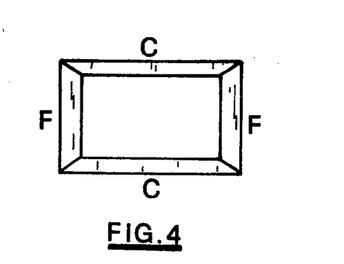
FIG. 4 shows, in front elevation form, a typical example of a structure that can be created in accordance with the "Folding" system using an apparatus according to the present invention.

Because of its being particularly suitable and advantageous, this system is widely used for the manufacturing of closed structures, an example of which is given in FIG. 4. The process starts with a panel of a length identical to the periphery of the structure it is wished to create, and of a width equal to its depth; then, as seen earlier on, the transverse millings are subsequently effected, then the bending and gluing of the various lateral sides takes place.

Using FIGS. 5, 6, 7 and 9, a description will now be given of the exemplary, preferred embodiment of an apparatus according to the present invention.

Figure 5:
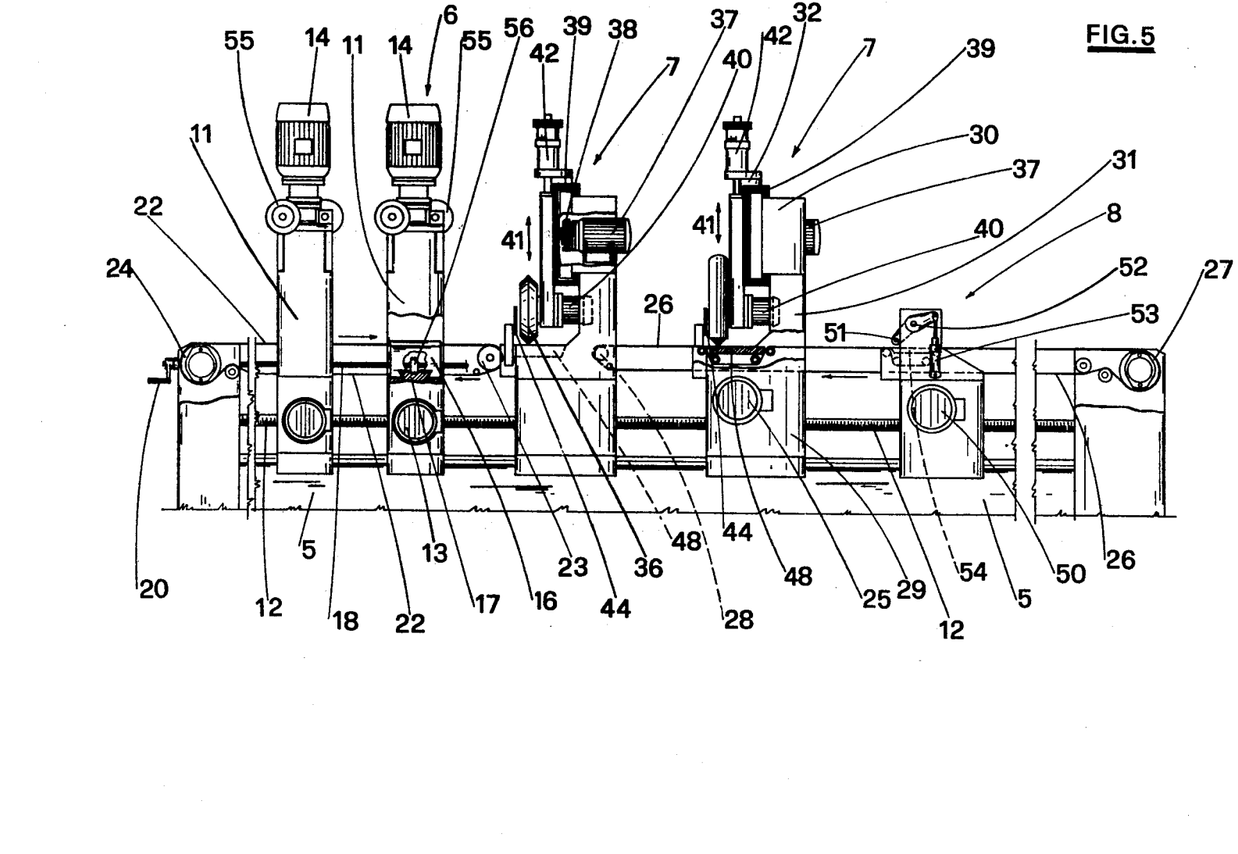
FIG. 5 shows, in front elevation form, an apparatus with certain parts removed in order that others can be seen more clearly in accordance with an exemplary embodiment of the present invention.

At 5 there is a bedplate, the extension of which is essentially longitudinal and on this, throughout its full length, there is a slide which supports and guides in succession: a set of drilling tools 6, two or more cutter devices 7 and at least one sensing feeler device 8.

Longitudinally to the apparatus and parallel to the bedplate 5 is fixed a long threaded rod 12 and with this mesh the devices for causing the assemblies 6, 7 and 8 to traverse in a longitudinal direction.

Each drilling tool is essentially constituted (see FIG. 7) by two cross members, that is to say, a lower cross member 9 and an upper cross member 10, which extend transversely to the axis of the said bedplate 5, and by two vertical uprights 11.

Figure 7:
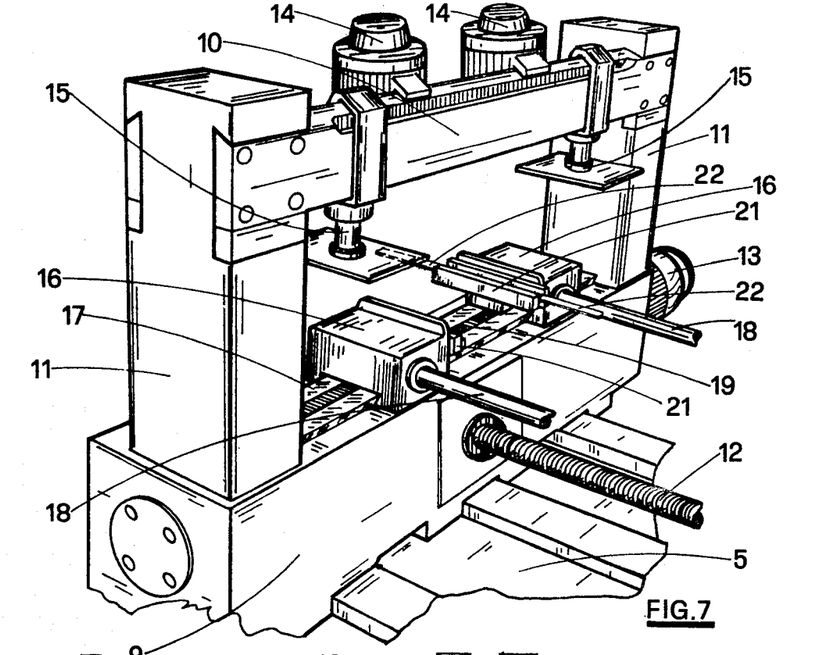
FIG. 7 shows, in a diagrammatic perspective view, one detail of the apparatus of FIG. 5, that is to say, a device for drilling.

The drive is taken from a motor 13 which, through a transmission system placed inside the lower cross member 9, causes the longitudinal traversing of the drill assembly.

Two drilling tools 14 can slide horizontally along the upper cross member 10, controlled by the handwheels 55 and the drilling tools 14 each carry a presser plate 15 movable vertically in both directions, operated, for example, by compressed air.

Underneath the pressure plates 15 there are two other plates 16 which are movable transversely in both directions on a slide 17 in the upper horizontal surface of the lower cross member 9. Each of the plates 16 is provided at its inwardly facing end with a stepped flange to support and guide a panel which is being machined.

The movement of the plates 16 is achieved through two long grooved profile rods 18 driving a gearwheel 56 located in the inside of each of the plates 16 (as can be seen in FIG. 5), which meshes with a rack 19.

The rotation of the rods 18 which causes the plates 16 for all the drilling tools with which the apparatus is equipped to move contemporaneously in a transverse direction, is achieved through the operation of the two handwheels 20 installed on the far end of the plant, prior to the drilling tools (see FIG. 5).

The use of grooved profile rods is necessary in order to allow the contemporaneous transverse movement of the plates 16 and the longitudinal movement of each of the drilling assemblies 6.

It is obvious that with two pairs of drilling tools 14 it is not possible, with the apparatus as illustrated, to obtain six holes (although this could be overcome by utilizing suitable universal type multi-spindle blocks).

In order to make the six holes (three pairs), three pairs of drilling tools 14 are needed with which to operate *contemporaneously* to drill the panel locked beneath them. In FIG. 5 only two pairs are shown, for reasons of drawing simplicity and clarity, since the apparatus may have considerably more than three pairs of drilling tools utilizable to suit the number of holes required in the panel. The particular panel illustrated has six holes in order to simplify the explanation, though the number could well be 8, 10 or 20 depending upon the requirements.

In FIG. 5 there is clearly visible an interruption line between the left side pair of drilling tools 14 and the pulley 24, indicating that the apparatus does not terminate with just two pairs of drilling tools 14, but that it has at least one more pair of drilling tools are provided along its axial extension. This additional pair of drilling tools has not been illustrated since this pair, as well as any other pair, is exactly the same as that shown in FIG. 5.

To the opposite vertical surfaces of the plates 16 are connected two small horizontal, longitudinal slides 21 movable vertically under the control, for example, of compressed air. The slides 21 act as guides and two conveyor belts 22 which turn in an endless fashion over two end pulleys 23 and 24, respectively, the former being the driven pulley and the latter, the drive pulley, both being movable vertically, together and contemporaneously with the slides 21.

In this way, the panel laying on the conveyor belts 22 is carried to a point where the drilling assemblies 6 are located and once it has been positioned, its infeed is halted; the slides 21 and the transmission pulleys 23 and 24 are lowered so as to allow the panel to rest on the stepped portions of the flanges of the plates 16 and, contemporaneously, the presser plates 15 are operated to lock the panel ready for the subsequent drilling operation.

After the drilling assemblies, two identical cutter devices 7 are positioned, one being stationary, and the other movable longitudinally under the operation of a motor 25 on the threaded rod 12, to enable them to be positioned reciprocally. Both the cutting devices 7 are supported by the bedplate 5, the left-more device 7 being fixedly supported.

Figure 6:
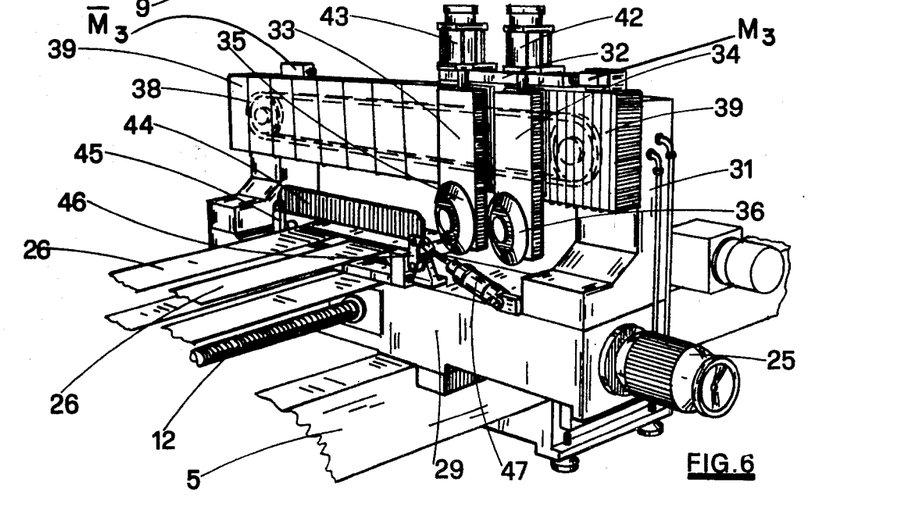
FIG. 6 shows, in a diagrammatic perspective view, the cutter device of the apparatus in FIG. 5 with certain parts removed in order that others can be seen more clearly.
Figure 9:
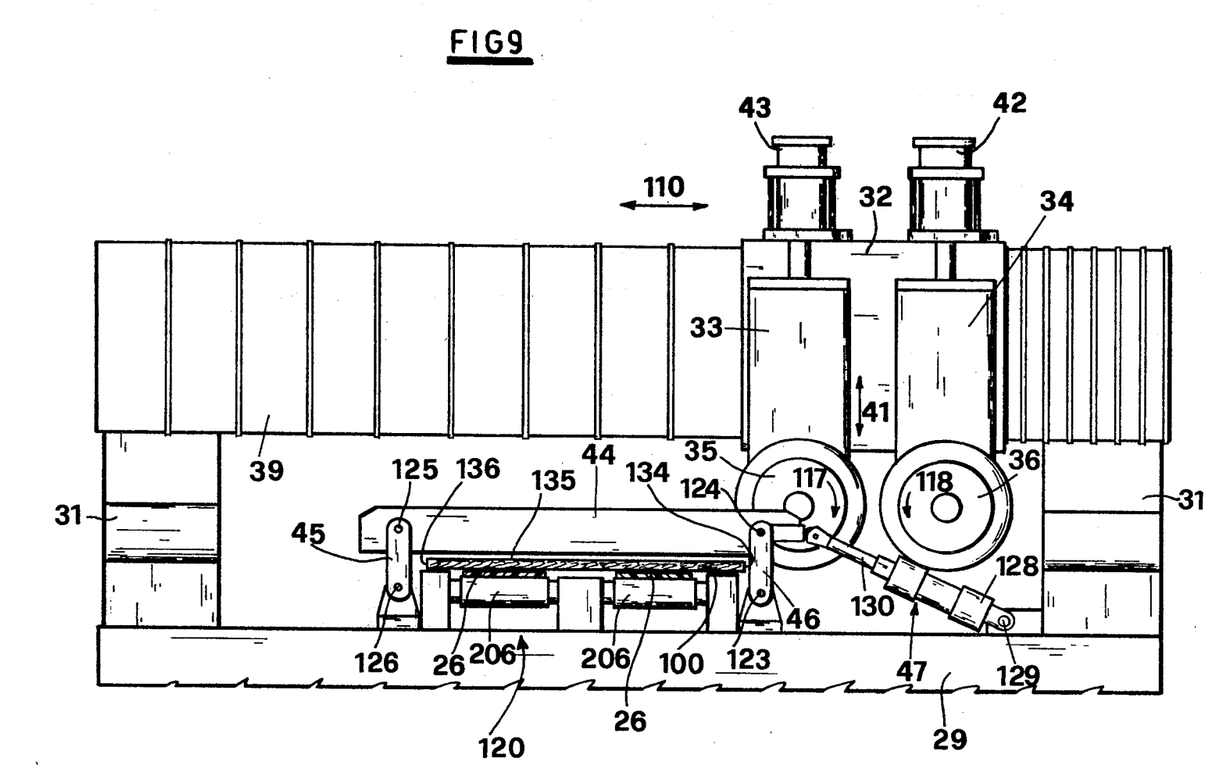
FIG. 9 shows, in a front diagrammatic view, the cutter device depicted in FIG. 6, with certain parts removed in order that others can be seen more clearly.

With reference to FIGS. 6 and 9, on which the movable cutter device is illustrated, at 29 there is a lower cross member to which is connected a conveyor system with rollers 120, the task of which is to infeed, along a direction perpendicular to the plane in FIG. 9, a panel 100 towards the cutter tools 35, 36. Respective lateral micro-limit switches $M_3$ and $M_3$ are positioned in respectively one and in the opposite directions of the cutter devices 7.

The conveyor system essentially consists of a set of idle rollers 206, the axes of which are horizontal and perpendicular to the direction in which the panel 100 is infed, the rollers being to support and guide an endless conveyor belt 26 that turns around two end drums 27 and 28, respectively, the former being the drive drum and the latter, the driven drum (see FIG. 5).

The said conveyor belt engages the panel as it leaves the drilling assemblies and the first stationary cutter device and passes it on towards the movable cutter device that is positioned past the first stationary cutter device, and towards the feeler device 8, more about which will be said in due course.

In the same way as previously described for the drilling assembly, the cutter devices include the lower cross member 29 and an upper cross member 30 visible in FIG. 5, as well as two vertical uprights 31.

Along the upper cross member 30 slides, in both directions, transversely to the panel and in a direction 110 perpendicular to the plane in FIG. 5, a carriage 32 supporting two assemblies 33 and 34, respectively, for operating the cutter tools 35 and 36, respectively, which, on the illustrated apparatus, are constituted by two circular angle cutters.

The carriage 32 takes its drive from a motor 37 and from an enclosed chain 38 protected by bellows 39 (see FIG. 6).

Each of the circular cutters is operated by a hydraulic motor 40 (seen in FIG. 5) and is able to rotate around a horizontal spindle parallel to the direction in which the panel is infed.

The aforementioned operating assemblies 33 and 34 and, consequently, the circular cutters 35 and 36, are able to move vertically, two ways, in the direction 41, one independently of the other, under the driving action of the two pneumatic cylinders 42 and 43, respectively.

Both of the circular cutters have the same profile and both lie in one and the same plane, perpendicular to that shown in FIG. 5, one after the other in such a way as to effect, on the panel, substantially identical cuts. Furthermore, they rotate in two opposite directions, that is to say, the cutter 35 rotates in the direction shown by the arrow 117, whilst the rotation of the cutter 36 is in the direction shown by the arrow 118.

The circular cutters are interchangeable, their profile varying from job to job to suit the type and surface to be milled and the type of bend it is wished to give the panel.

Again, in FIGS. 6 and 9, a device can be seen for locking the panel whilst it is being milled: the device comprises an upper cross member 44 parallel to the lower cross member 29 and connected to it by means of the two members 45 and 46, respectively, in such a way as to give rise to an articulated parallelogram at the points 123, 124, 125 and 126.

The operation of the said articulated parallelogram occurs through a cylinder 47, the body 128 of which is connected at 129 to the cross member 29, and the stem 130 is connected at 124 to the upper cross member 44 of the said locking device.

The operation of the cylinder 47 causes the panel 100 to be locked ready for the subsequent milling operation to be effected.

A brief look will now be taken at how the cutter device operates.

With the panel to be machined placed on the conveyor system, the latter is operated until the panel is positioned suitably for the cutter tools which have to perform an initial transverse milling operation thereon.

Subsequently, the cylinder 47 for the locking of the panel 100 is operated and then the movement of the carriage 32 and, consequently, of the cutter tools themselves, is made to take place along the cross member 30 from right to left.

At this time, the circular cutters 35 and 36 have the configuration shown in FIG. 9, that is to say, their vertical positioning is such that they are able to make on the panel, millings which are identical and perfectly coincident. Furthermore, their direction of rotation is that indicated with the arrows 117 and 118.

Following the aforementioned horizontal movement, the vertical edge 134 of the panel 100 is machined by the circular cutter 35, the direction of rotation of this being such that the splintering of the said vertical edge 134 of the panel is prevented.

The direction in which the circular cutter 35 rotates can, however, give rise to probable splintering on the upper horizontal surface 135 and on the vertical outgoing edge 136 of the panel 100 and thus once the cutter assembly has moved sufficiently to execute the milling on the vertical edge 134 of the panel, the cylinder 43 is allowed to operate and this brings about the vertical movement of the circular cutter 35 and, in consequence, its being taken out of operation.

From this point onwards, the circular cutter 36 transversely mills the panel 100 which, thanks to the direction of rotation of this cutter, suffers no splintering either on the upper horizontal surface 135 or on the vertical outgoing edge 136. Once the milling operation has finished, the pneumatic cylinder 43 again comes into operation in order to carry the cutter 35 to the position in which it is ready to start a new cycle, that is to say, at the same height as the circular cutter 36.

After this, the pneumatic locking cylinder 47 has its supply cut off, the conveyor belt 26 operates to carry the panel to a position suitable for a second milling operation to be carried out and then the said panel is locked again by the cross member 44.

At this juncture the cutter assembly comes into operation, this time moving from left to right, to repeat the operations previously described in a symmetrical manner and succession. During this second operation, the circular cutters naturally maintain the same direction of rotation as for the first operation, that is to say, the direction indicated with the arrows 117 and 118.

Figure 10:
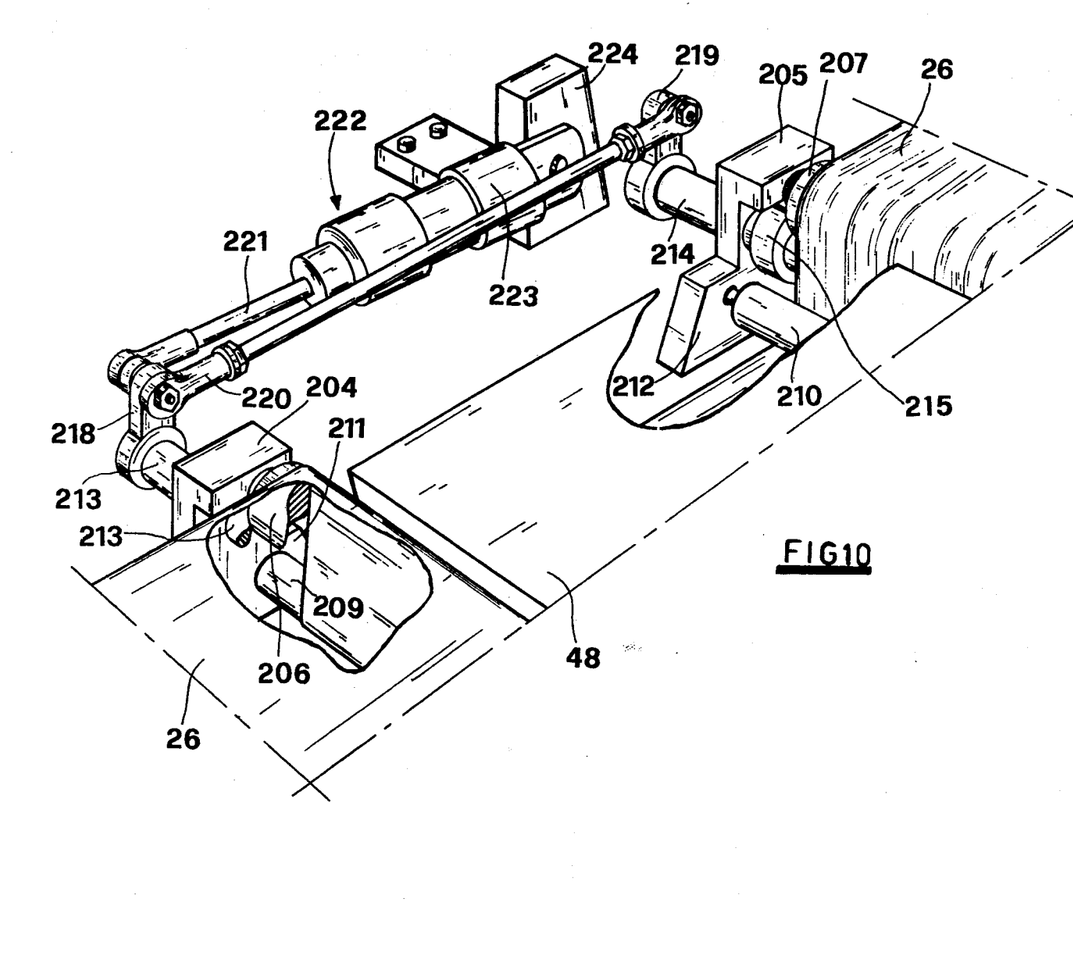
FIG. 10 shows, in a diagrammatic perspective view, one detail of the illustrated embodiment of the present invention, that is to say, the conveyor belt on which the panel is carried forward.
Figure 11:
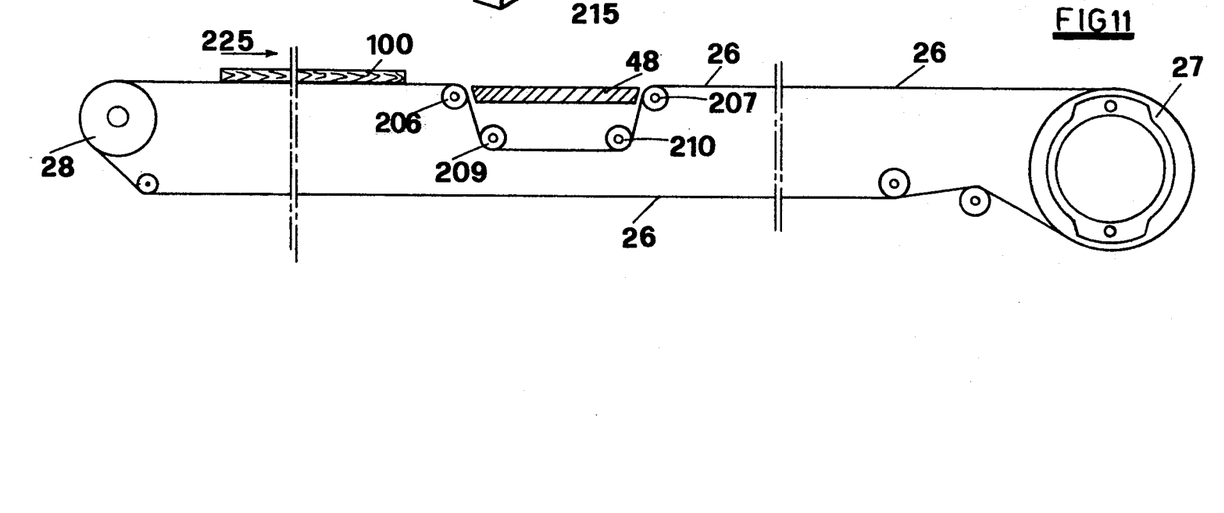
FIG. 11 shows, in a front diagrammatic view, the conveyor belt depicted in FIG. 10.
Figure 12:
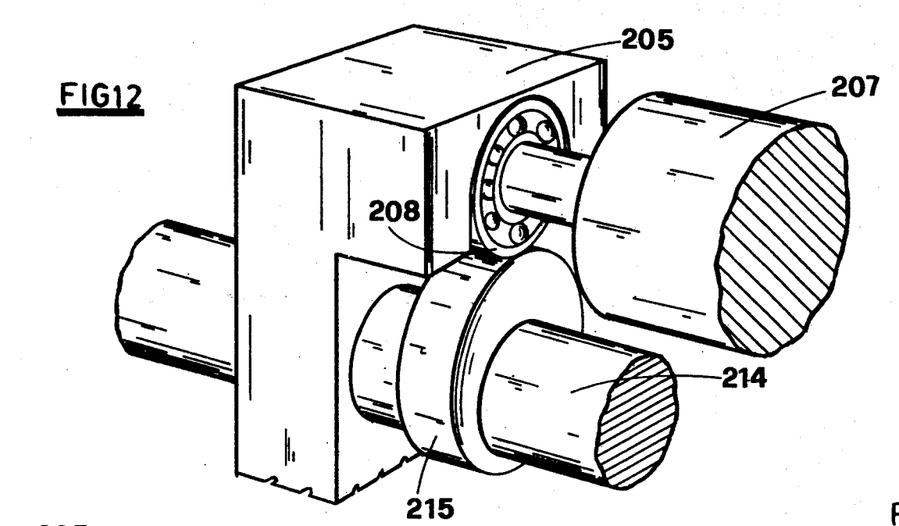
FIG. 12 shows, in a diagrammtic perspective view, one detail of the conveyor belt of FIG. 10, that is to say, the system for positioning and adjusting the first cylindrical idle rollers.

In FIGS. 10, 11 and 12, the conveyor belt for the apparatus is shown; particularly in relation to the cutter device 7 and the feeler device 8, more about which will be said in due course. At 204 and 205, these figures show two support members for two first horizontal cylindrical idle rollers 206 and 207, the axes of which are parallel to those of the end drums 27 and 28. The first cylindrical rollers 206 and 207 are located beneath the upper part of the conveyor belt 26 and act as supports and guides for it.

The end pins of the first cylindrical rollers 206 and 207 engage with corresponding radial bearings 208 seated in a semi-circular housing in the support members 204 and 205 (see FIG. 12).

Two second cylindrical rollers 209 and 210, respectively, supported by the two members 211 and 212, respectively, are positioned at a level lower than that of the first cylindrical rollers 206 and 207 and these idle around pins parallel to the axes of the first cylindrical rollers.

The second cylindrical rollers 209 and 210 act as intermediate rollers for the section of the belt between the first rollers 206 and 207.

Underneath the first cylindrical rollers 206 and 207 there is a shaft 213 and 214, respectively, parallel thereto and as its support member, each utilizes the aforementioned members 204 and 205. At a point corresponding to where each radial bearing 208 of the first cylindrical rollers 206 and 207 is located and in contact therewith, each of the shafts 213 and 214 has a cam 215 designed to position the first rollers 206 and 207 in a vertical direction, through the rotation of the shafts 213 and 214.

Again with reference to the accompanying figures, at 48 there is a stationary horizontal rigid platform and this, positioned between the first cylindrical rollers 206 and 207, is intended to constitute the surface on which a panel 100 moved by the continuous belt 26 rests.

To one extremity of the shafts 213 and 214 are integrally secured the two arms 218 and 219 which, together with an adjustable rod 220, constitute an articulated parallelogram. The upper end of the arm 218 has connected to it the stem 221 of an operating cylinder 222, the body of which is anchored to a bracket 224 integrally fixed onto the frame of the apparatus.

When the operating cylinder 222 is working, the aforementioned articulated parallogram is actuated and, consequently, the shafts 213 and 214 rotate, two ways, around their respective axes. In this way, under the action of the cams 215 on each of the radial bearings 208 of the first cylindrical rollers, the latter are positioned as required, in a vertical direction with respect to the stationary rigid platform 48.

To be more precise, the operating cylinder 222 causes the first cylindrical rollers to be positioned between an upper and a lower extreme point, corresponding to which the rigid platform 48 is either slightly lower or slightly higher than the plane tangential to the conveyor belt in the region of the said first cylindrical rollers 206 and 207.

The operation of the aforementioned conveyor belt will now be briefly examined.

When a panel 100 is placed on the conveyor belt 26, the said belt moves in the direction shown by the arrow 225 until the panel has been carried where the rigid platform 48 is located.

At this initial stage, the rollers 206 and 207 have the configuration depicted in FIG. 11 that is to say, they are in their upper furthermost position in relation to which the rigid platform 48 is at a slightly lower level than the plane tangential to the conveyor belt in the region of the said first cylindrical rollers 206 and 207.

At this joint, the operating cylinder 222 causes, through the action of the articulated parallogram, and the cams 215, the said first cylindrical rollers 206 and 207 to be lowered until they have been carried into the lower furthermost position. Not only does the weight of the rollers 206 and 207 themselves aid this downward movement but so does also the flexible action of the conveyor belt 26.

The rollers 206 and 207 are carried on respective shafts, each end of which is supported by a roller bearing arrangement fixed in a groove within the respective members 205 and 204 in contact with the respective cams 215, the details of the mounting of one end of the roller 207 being shown in FIG. 12. The other end of the roller 207 and the ends of roller 206 are similarly mounted.

During the subsequent machining of the panel 100, it thus rests on a perfectly rigid surface.

Through the operation that follows afterwards of the cylinder 222 in the reverse direction to that in which it went previously, and that of the conveyor belt, the panel is moved and positioned ready for the forthcoming machining operations in exactly the same way as seen above.

To complete the apparatus, a feeler device 8 which is also movable longitudinally through a motor 50 operating the threaded rod is installed after the cutter device 7.

The device 8 consists essentially of rollers rotatable around a horizontal transverse shaft 51 which, in turn, is rotatable around a horizontal transverse shaft 52. A cylinder 53 causes the rollers to constantly grip the surface of the panel whilst it is being moved forward.

When the feeler device perceives the presence of the end of the panel arriving or a groove caused by milling, the forward motion of the panel is brought to a halt in a way that will be explained more clearly in due course.

Corresponding to where the device 8 is located, there is also a stationary horizontal rigid platform 54, the purpose of this being to prevent the panel from flexing whilst the feeler device is operating.

Using FIG. 8, an examination will now be made of the succession of operations which lead to the creation of a closed structure of the type depicted in FIG. 4.

To start off a panel is used of a width equal to the depth of the structure it is wished to form; the length of the panel being equal to its periphery.

Figure 8:
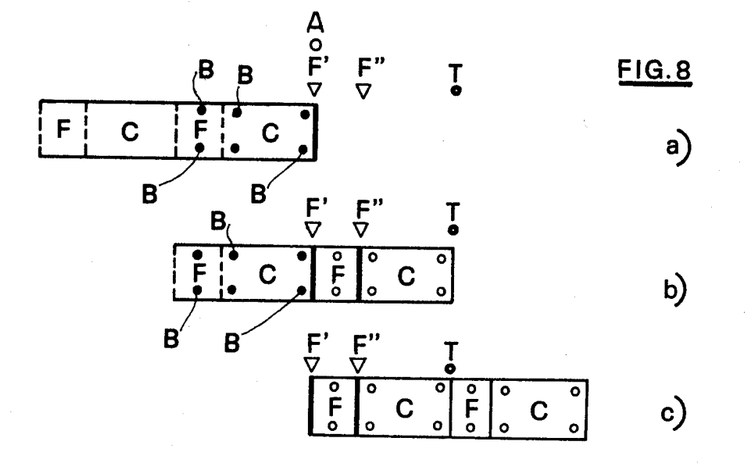
FIG. 8 shows, in diagrammatic form, the successive operations of milling and drilling a panel, performed in order to create the closed structure depicted in FIG. 4 using an apparatus according to the present invention.

In FIG. 8 the long sides of the structure are shown with the letter C and the short sides with the letter F (this can also be seen in FIG. 4). F' and F" are schematic representations of the first and the second cutter device, respectively "T" is a schematic representation of the feeler device; and "B" are the holes to be made in the panel by the drilling tools 14.

The distance between the feeler device "T" and the nearest cutter device F" is equal to the length of one lateral side of the structure, that is to say, it is equal to the length of a long side "C" or a short side "F"; in the case shown in FIG. 8, however, it is equal to the length of one long side "C". The distance between the cutter devices F' and F" is, instead, equal to the length of a short side "F".

The way in which the drilling tools are positioned, prior to the cutter device F', is such as to give rise to the holes "B" that can be seen in FIG. 8a, that is to say, the drilling tools do not drill holes in the whole panel at the same time but in a given section and then, after the subsequent milling operation, on two lateral adjacent sides of the resulting structure, that is to say, one long side "C" and one short side "F".

When the panel is placed on the conveyor belt 22, the belt moves forward until, in the proximity of the cutter device F' it encounters a device which causes it to stop: the device can be an ordinary sensor such as, for example, a photoelectric cell. At this stage no extremely precise positioning of the panel is necessary (hence the reason why a photoelectric cell can be used) since F' executes a thorough milling operation, that is to say, it butts the panel which, as will be seen, becomes the reference point for the subsequent operations.

In this connection it should be noted that whether an ordinary milling or a through milling operation is performed depends on the setting given to the pneumatic cylinders 42 and 43 which vertically move the cutters 35 and 36.

Obviously through milling is performed on both ends of the panel.

Referring to the configuration shown in FIG. 8a, the sequence is as follows:
the drilling tool/presser plate devices operate
the drilling tools make the first set of holes "B"
the panel locking device for the cutter F' operates
the cutter F' performs the initial through milling operation on the panel When this first stage has been completed, the conveyor belts 22 and 26 are again set in motion and once the head of the panel arrives in the region where the feeler device "T" is located, it is again halted in the configuration shown in FIG. 8b for:
the drilling tool/presser plate devices to operate
the drilling tools to make the second set of holes "B"
the panel locking device for the cutters F' and F" to operate
the cutters F' and F" to perform their milling operations.

Subsequently the panel is again made to move forward: the feeler device "T", suitably set, misses one groove and "reads" the one after, halting the panel again and giving rise to the final machining operation corresponding to the configuration shown in FIG. 8c, for which:
the panel locking device for the cutters F' and F" operates
the cutters F' and F" perform their milling operations, particularly the final through milling of the panel on the part of cutter F'.

As regards the drive provided to the various units of the apparatus, this, in keeping with the cycle described as a function of the operation of the feeler devices, may be obtained either through programming with a sequencer or through the use of microprocessors, or even electronic computers, since this makes it possible, with simple variations of cards or programs, to vary the operating sequences of the apparatus to suit the needs (operation of the drilling tools dependently or independently of one another, with respect to the cutters).

It can thus be seen that the apparatus is exceptionally versatile, and this is fundamental since the panels are not all machined in the same way, indeed each gives rise to closed structures which may differ greatly one from the other (the very fact that the apparatus is used particularly in the creation of what are known as "kitchen units" makes the working variation required for the machine quite clear). It is clear that once one has decided to produce a particular structure, a simple program or wired-in programmed circuit can be set up by any person of ordinary skill in the programming arts.

Figure 13:
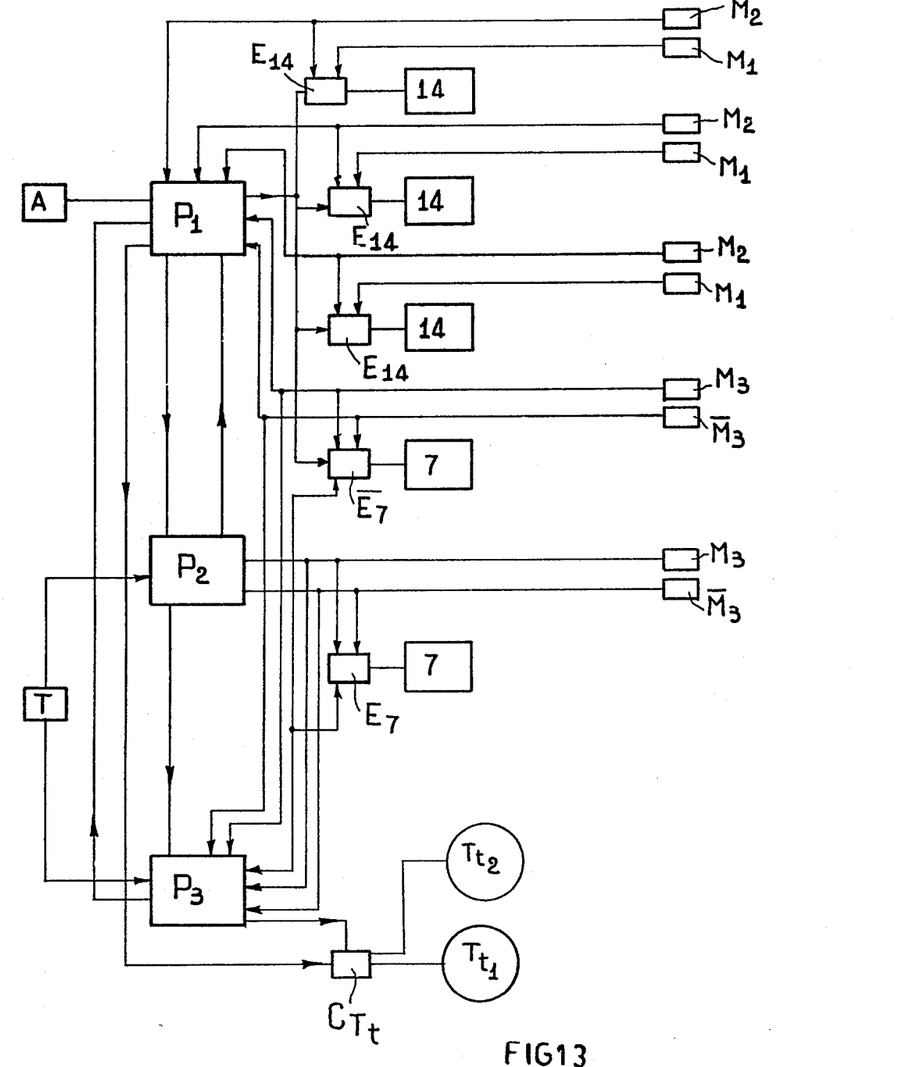
FIG. 13 is a schematic block circuit diagram useful in understanding a cycle of the operation of the apparatus.
Figure 14:
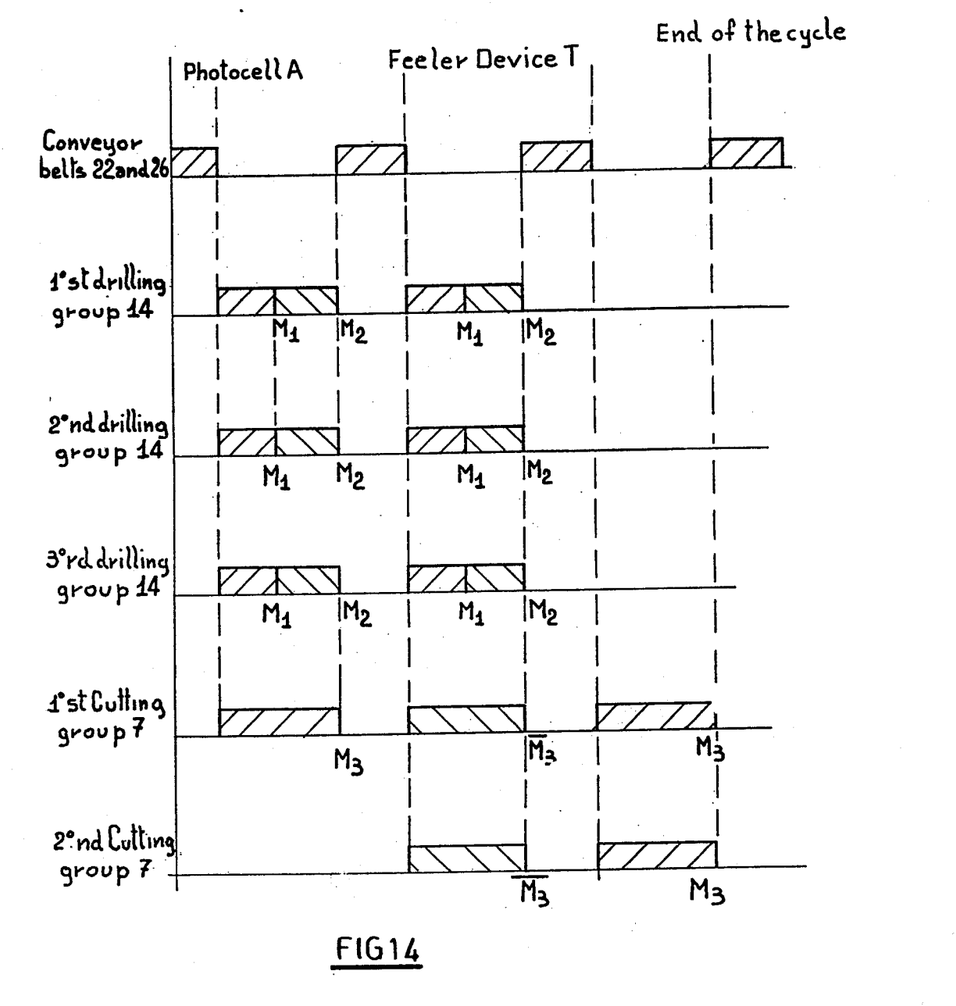
FIG. 14 is a series of graphs constituting a phase diagram helpful in understanding the operation of the apparatus with reference to FIG. 13.

A suitable circuit for providing the required control of the apparatus is shown in FIG. 13 as a block circuit diagram, a brief description of the circuit of FIG. 13 and its operation follows, reference being made to FIG. 14 and to members also shown in other figures.

In FIG. 13: $M_1$ is the lower micro-switch to reverse the motion of translation of the pairs of drilling tools 14; $M_2$ is the upper micro-limit switch for the drilling tools 14; $M_3$ is the lateral micro-limit switch in one direction of the cutter devices 7 (see FIG. 6); $\overline{M}_3$ is the lateral micro-limit switch in the opposite direction of the cutter groups 7; A is the photocell for detecting the arrival of the panel (see FIG. 8); T is the feeler device (FIG. 8); $P_1$, $P_2$, $P_3$ are memories; $T_{t1}$, $T_{t2}$ are advancement motors; and 22 and 26 are conveyor belts.

When the head of the panel 1 passes into the radius of action of the photocell A, this sends an electrical signal to the memory $P_1$, which is consequently actuated.

The energizing of the memory $P_1$ causes an electrical signal to be emitted to the contactor $C_{Tt}$ and the consequential halting of the motors $T_{t1}$, $T_{t2}$ provided for powering the conveyor belts 22 and 26. Furthermore, the memory $P_1$ operates the electrovalves $E_{14}$ (each of which is provided to supply a pneumatic jack that drives vertically, in one direction or the other, a corresponding pair of drilling tools 14 and the electrovalve $E_7$ provided to operate a pneumatic motor that drives transversely, in one direction or the other, the first cutter devices 7 (that corresponding to F').

The operation of the electrovalves $E_{14}$, involves the downward travel of the pairs of drilling tools 14 (with formation of six holes B, FIG. 8), the upward travel of which is controlled by the corresponding micro-switches $M_1$ tripping the electrovalves $E_{14}$. The upward travel of the pairs of drilling tools 14 halts because of the tripping of the corresponding micro-limit switches $M_2$ which operates the electrovalves $E_{14}$ and send electrical limit signals to the memory $P_1$. In the same way, the operation of the electrovalve $E_7$, involves the translation of the relevant cutter device 7 (with the formation of a groove 3 in the head of the panel 1, configuration 8a) which ceases because of the micro-limit switch $M_3$ (or $\overline{M}_3$) tripping the said electrovalve $E_7$.

When the last electrical signal from the micro-limit switches (that is to say, the micro-switches $M_2$ and a micro switch $M_3$ or $\overline{M}_3$) reaches the memory, this trips the contactor $C_{Tt}$ (in order to energize the motors $T_{t1}$ and $T_{t2}$) and prepares the memory $P_2$ for actuation.

The actuation of the said memory $P_2$ is commanded by the feeler T when this is flush with the groove 3 previously made in the head of the panel. The memory $P_2$ operates the memory $P_1$ and this brings about the fresh actuation of the devices controlled by the said memory $P_1$ and, furthermore, that of the electrovalves $E_7$ which is provided to operate a pneumatic motor 37 for driving the second cutter devices 7 (that corresponding to F") transversely, in one direction or the other.

The downward travel and subsequent upward travel of the pairs of drilling tools 14 brings about the formation of a new set of six holes B (phase b in FIG. 8), whilst the translation of the two cutter devices 7 (F' and F") brings about the formation of two grooves 3 in the central part of the panel.

When the final electrical signal from the micro-limit switches (that is to say, the micro-switches $M_2$ and the micro switches $M_3$ and $\overline{M_3}$) arrive at the memories $P_1$ and $P_2$, the motors $T_{t1}$ and $T_{t2}$ are again powered, the memory $P_3$ is prepared for operation, and the memories $P_1$ and $P_2$ are completely de-energized (that is to say, the previously memorized data is cancelled out).

The actuation of the memory $P_3$ is ordered by the feeler T when this "inserts" itself in the third groove 3 that has already been made; see FIG. 8c. The operation of the memory $P_3$ brings about the halting of the motors $T_{t1}$ and $T_{t2}$ and the actuation of the cutter devices 7 (F' and F''); this results in the formation of two further grooves 3 in the terminal part of the panel.

The cycle is completed with the de-energizing of the memory $P_3$ (ordered by the final limit impulse of the micro-switches $M_3$ or $\overline{M_3}$), and the preparation of the memory $P_1$ for operation in a new cycle.

The feeler T is so shaped that it overrides one groove 3, that is to say it emits en electrical signal for every two grooves detected.

The working travel of the cutter devices 7 corresponds to one direction only, after which the carriage halts. The subsequent return travel constitutes a further working travel; hence the reason why the tripping action is given by the micro-switches $M_3$ or $\overline{M_3}$, depending on the initial starting configuration.

In FIG. 14, a phase diagram in the form of graphs is depicted for the apparatus with, on the abscissae, the tripping times of the individual devices shown on the ordinates. The differently oriented hatch indicates the mode of translation of the individual devices in the two directions opposite to one another.

FIG. 14 illustrates diagrammatically the operative phases, that is the operation of the various devices and conveyors with respect to time.

In other words, FIG. 14 shows diagrammatically, that is to say not in linear proportion to time, the operative phases of the various devices relating one to other, precedently described, the points in time at which the switches $M_1$, $M_2$, $M_3$ and $\overline{M_3}$ are actuated being shown along the time axis.

In the abscissa of FIG. 14 is indicated the variable time and in ordinate, relatively to each group, is indicated the moving of the devices of groups 14 and 7 and the intervention or not of the conveyors 22, 26.

It can be seen from the foregoing that the essential characteristic of the apparatus forming the subject of the present invention, which envisages the machining operations being repeated one after the other, is most certainly achieved in accordance with the "Folding" system.

After all, the advantage can clearly be seen of having the drilling assemblies positioned ahead of the cutter tools and of contemporaneously executing at least some of the drilling and milling operations, in the certainty that, in this way, the sets of holes are centered perfectly, that is to say, they are not staggered with respect to the milling of the panel or, in other words, to the corners of the resulting structure.

Furthermore, by drilling prior to milling, when the panel is still untouched and unweakened by milling grooves, dangerous flexure is avoided which could cause breakages.

After consideration concerns the possibility of mounting, where the cutter device "F" is positioned, right after the cutter tools 35 and 36, referred to the direction in which the panel moves forward, a second feeler device so as to enable structures to be made with lateral sides of a short length, which otherwise would not be possible since the feeler device 8 cannot approach the cutter device F'' beyond a certain limit.

It is also possible to install a second feeler device at the side of the first device, a short distance away from it in the direction in which the panel moves, so as to be able to halt and position the panel for the cutter devices to execute a milling operation very close to the one previously effected; this means that the distance the feeler devices are apart from each other has to correspond to the distance between two successive milling operations performed on the panel by one and the same cutter device.

Insofar as the cutter devices are concerned, it can be seen, furthermore, that is has been possible to overcome panel splintering problems caused by the direction of rotation of the tool and, above all, that this invention succeeds in reducing machining times considerably, since, as previously stated, the cutter tools operate in both directions and not just in one.

As a consequence of the foregoing, maintenance times for replacing worn out cutters are halved with respect to other plants since the tools alternate perfectly.

The term "cutter tools" can obviously refer either to cutters or to circular saws for cutting completely through a panel.

Finally, it can be seen that when the number of cutter devices is increased, it is possible to carry out operations for making particularly complex structures; such requirements need to be examined case by case, although basically the operational scheme remains basically as outlined above. The automatic apparatus in question can naturally be connected up to an electronic console in order to render all the operations described in the foregoing, controlled automatically.

From the description given above, it is obvious that that automatic apparatus forming the subject of the present invention fully achieves the above-mentioned objects and that it is extremely simple and reliable in operation.

The practical form of embodiment of the invention can vary from what has been described above and, in particular, modifications of a practical nature may be made to the constructional details, without this in any way constituting a loss of the protection afforded thereto.

What is claimed is:

1. An automatic apparatus for machining panels, planks and similar articles made of wood, wooden derivatives and like materials, the apparatus comprising, in combination:

means for conveying a panel along a given path in a direction parallel to its longitudinal axis;

at least one set of drilling tools positioned along a first portion of said path along which the panel to be machined is to be carried forward;

a plurality of cutter devices each including at least one respective cutter tool and positioned in spaced relation to each other along a second portion of said path downstream of said set of drilling tools with one of said cutter devices being positioned downstream of all others of said cutter devices for milling the panel along a direction transverse to said path;

at least one moveable sensing feeler device installed along a third portion of said path downstream from said cutter devices for sensing the presence of milling in a panel as it moves along said path; and means responsive to movement of said feeler device as it senses the presence of milling in a panel for causing the panel to halt and to be in exact position necessary for the aforementioned drilling and milling tools, the distance between said feeler device and said one of said cutter tools forming part of said one of said cutter devices being equal to the length of at least one lateral side of a structure which is to be formed;

whereby milling and drilling may take place contemporaneously during the course of making the structure to be formed.

2. An automatic apparatus according to claim 1, particularly for machining panels so as to make structures having a rectangular peripheric extension, wherein said plurality of cutter devices is constituted by two cutter devices and said at least one feeler device is constituted by one feeler device, the distance the latter is spaced from the cutter tool carried by the cutter device nearer to it being equal to a length of a first lateral side of the structure to be formed, and the distance said cutter devices are apart from one another being equal to a length of a second lateral side of the structure to be formed.

3. An automatic apparatus according to claim 1, wherein said drilling tools are positioned to contemporaneously machine a section of a panel over a length corresponding to two different adjacent lateral sides of the structure to be formed.

4. An automatic apparatus according to claim 1, wherein each of said cutter devices carries two cutter tools placed one after the other with respect to a given operating direction, said two cutter tools being provided with opposite directions of rotation; and including means for causing said two cutter tools to traverse parallel to a given surface of the panel;

means for causing said two cutter tools to move, one independently of the other, between two furthermost positions, a lower furthermost position in each case causing removal of material from a panel by a corresponding one of said two cutter tools, and an upper furthermost position in each case causing the corresponding cutter tool to fail to remove material, said means for causing said cutter tools to move between the two furthermost positions acting in conjunction with said means for causing said cutter tools to traverse the panel.

5. An automatic apparatus according to claim 1, wherein said means for conveying a panel comprise endless belt means having a conveyor belt turning around at least two horizontal axis end drums, one of which at least is a drive drum, said conveyor belt being positioned adjacent said cutter devices and said feeler device and provided with at least two first idle rollers, each rotating around a respective horizontal axis parallel to the axes of said end drums, said idle rollers being located underneath an upper part of said conveyor belt to act as support and guides therefor; means for causing the axes of the said first idle rollers to move between an upper and lower furthermost position, at least one second idle roller, rotating around an axis parallel to the axes of said first idle rollers, placed at a level lower than a plane through which the axes of the latter pass, said second idle roller acting as an intermediate roller for a section of said belt between said first idle rollers; and a stationary rigid platform designed to constitute, whilst machining is in progress, a surface on which a panel to be carried by said conveyor belt rests, said rigid platform being placed underneath said cutter devices, between said first rollers, parallel to a plane tangential to an upper span of said conveyor belt, at a point corresponding to where said first rollers are positioned, said rigid platform being at a level slightly below that of said aforementioned plane tangential to the upper span of said conveyor belt when said first idle rollers are in their uppermost position and at a level slightly above that of said aformentioned plane tangential to the upper span of said conveyor belt when said first idle rollers are in their lowermost position.

6. An automatic apparatus according to claim 5, wherein said means for causing said axes of said first idle rollers to move comprise: a housing extending vertically, inside which is seated for each of said first rollers, a set of bearings; at least two shafts, each placed underneath a corresponding one of said first rollers and parallel thereto, and having at a point corresponding to where respective sets of bearings for said first idle rollers are located and in contact therewith; cam means, said shafts forming part of an articulated parallelogram the operation of which effects rotation, in both directions of said shafts around their respective axes, said first rollers being positionable with respect to said stationary rigid platform by said cam means.

7. An automatic apparatus according to claim 1, wherein means are provided for causing positioning in a longitudinal direction of each set of said drilling tools, one with respect to the other and with respect to the nearest one of said cutter devices.

8. An automatic apparatus according to claim 1, wherein said plurality of cutter devices is constituted by two cutter devices, and including means for causing positioning in a longitudinal direction of said at least two cutter devices, one with respect to the other.

9. An automatic apparatus according to claim 1, wherein said cutter tools carried by said cutter devices are constituted by circular cutters.

* * * * *